United States Patent [19]

Wakaizumi et al.

[11] Patent Number: 4,617,035
[45] Date of Patent: Oct. 14, 1986

[54] GAS ADSORBENT AND PROCESS FOR PRODUCING SAME

[75] Inventors: Akira Wakaizumi, Tokyo; Hiroshi Kawakami, Yokohama, both of Japan

[73] Assignee: Nippon Sanso Kabushiki Kaisha, Tokyo, Japan

[21] Appl. No.: 675,846

[22] Filed: Nov. 28, 1984

[51] Int. Cl.$^4$ .......................................... B01D 53/04
[52] U.S. Cl. ...................................... 55/389; 55/387; 502/416; 502/432
[58] Field of Search ................. 55/75, 387, 389; 502/34, 56, 62, 405, 416, 417, 430, 432

[56] References Cited

U.S. PATENT DOCUMENTS

| | | | |
|---|---|---|---|
| 1,917,689 | 7/1933 | Baum | 502/405 X |
| 2,342,856 | 2/1944 | Hall | 502/34 |
| 2,501,700 | 3/1950 | Stuart | 502/432 |
| 3,151,088 | 9/1964 | Sanford et al. | 502/34 X |
| 3,168,482 | 2/1965 | Anderson et al. | 502/34 X |
| 3,960,769 | 6/1976 | Münzner et al. | 502/417 |
| 3,960,771 | 6/1976 | Tanaka et al. | 55/389 X |
| 3,979,330 | 9/1976 | Münzner et al. | 502/416 X |
| 4,242,104 | 12/1980 | Frost et al. | 502/34 X |

FOREIGN PATENT DOCUMENTS

| | | | |
|---|---|---|---|
| 769800 | 1/1972 | Belgium | 55/389 |
| 2206982 | 8/1972 | Fed. Rep. of Germany | 502/416 |
| 2458170 | 6/1976 | Fed. Rep. of Germany | 55/389 |
| 93294 | 8/1978 | Japan | 502/56 |
| 119288 | 10/1978 | Japan | 502/56 |

Primary Examiner—Robert Spitzer
Attorney, Agent, or Firm—Kane, Dalsimer, Kane, Sullivan and Kurucz

[57] ABSTRACT

Gas adsorbent and process for producing same. A zeolitic or silica-alumina adsorbent is heat treated in a carbon atom-containing gas or a gaseous mixture consisting of a carbon atom-containing gas and an inorganic gas at 100° to 700° C. to produce the gas adsorbent. The gas adsorbent has carbon particles ranging in size from about 0.01 to about 10 μm adhering on the surface or in pores thereof.

3 Claims, 3 Drawing Figures

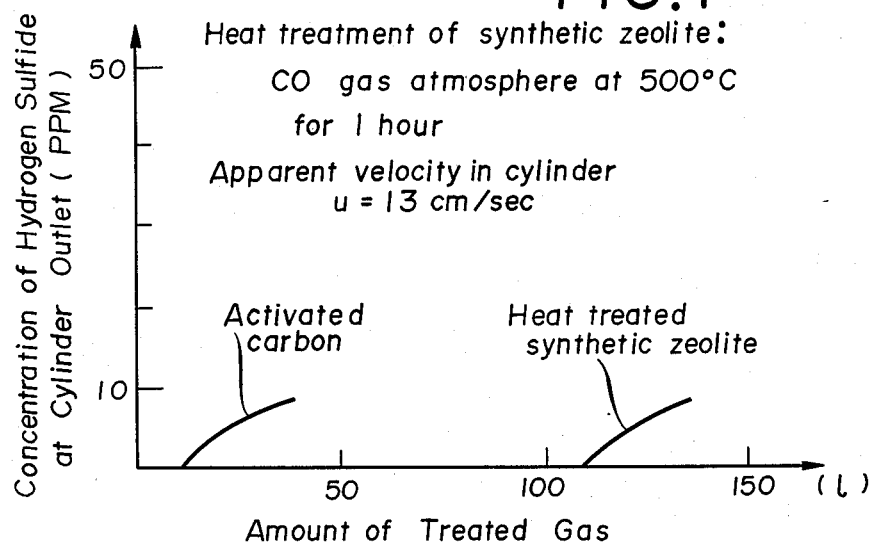
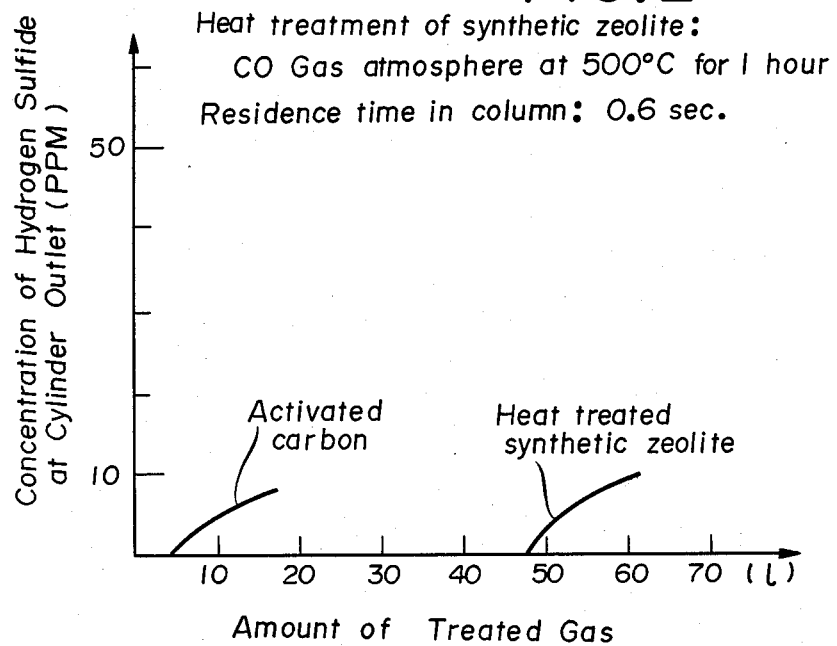

GAS ADSORBENT AND PROCESS FOR PRODUCING SAME

BACKGROUND OF THE INVENTION

This invention relates to a gas adsorbent including either a zeolitic adsorbent such as synthetic or natural zeolite or a silica-alumina adsorbent such as silica gel or alumina gel and also relates to a process for producing such a gas adsorbent.

Adsorbents in common use include synthetic and natural zeolites, activated carbon, and silica-alumina adsorbent which means silica gel, alumina gel or gel of their composite. These are employed singly as a mass or as a stack of multiple layers or a mixed bed of different adsorbents, depending on the intended use. Usually, individual adsorbents have limited applications; they do not singly serve all purposes but work only selectively and severally. Requirements of adsorbent performance for particular purposes are often not satisfied, and therefore various adsorbents possessing novel functions and capacities are needed. For example, removal by adsorption of nitrogen oxides (NO, $NO_2$, etc.), sulfur oxides ($SO_x$), and sulfur compounds ($H_2S$, organosulfur compounds, etc.) is involved in pollution control, exhaust gas treatment, prerefining for gas separation, and other operations. For these purposes adsorbents having optimum properties, i.e., high adsorptivities, are being called for. Synthetic zeolites, for example, exhibit excellent performance in separating and drying hydrocarbons and in removing carbon dioxide gas, but the very low rates of nitrogen oxide removal by adsorption have hampered their practical use. Aside from the synthetic zeolites, silica gel and alumina gel are known adsorbents ror nitrogen oxide removal. However, their removal rates have again been too low for practical purposes.

SUMMARY OF THE INVENTION

Our ressarch, made under these circumstances to improve the capacities of various adsorbents of the prior art to adsorb different gases, has now led to the present invention whereby adsorbents excellently capable of adsorbing specified gases are obtained. Extensive experiments have been performed to obtain such excellent adsorbents for the removal of gases such as nitrogen oxides, hydrogen sulfide, carbon dioxide, and/or carbonyl sulfide. As a result, it has now been found that a heat treatment of a synthetic and natural zeolites, silica gel, or alumina gel in an atmosphere of carbon monoxide or a mixed gas based on such a carbon-containing gas at about 100° to 700° C. will remarkably improve the adsorbent capacity of removing nitrogen oxides and/or other gases.

BRIEF DESCRIPTION OF THE DRAWINGS

FIGS. 1 and 2 are graphs showing the results of comparative experiments on hydrogen sulfide-adsorbing capacities of activated carbon and a synthetic zeolite heat-treated in conformity with this invention.

DETAILED DESCRIPTION OF PREFERRED EMBODIMENTS

Figure 3:
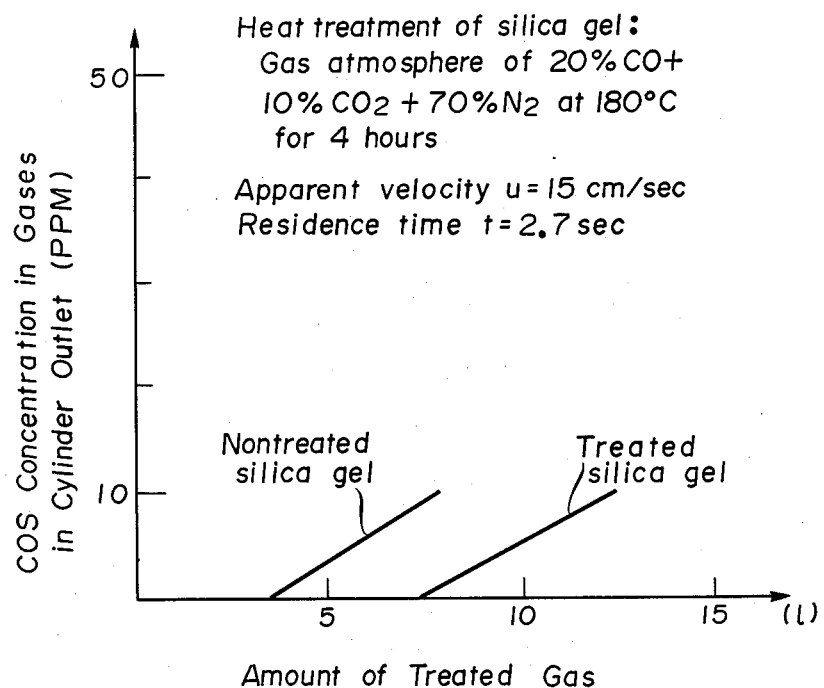
FIG. 3 is a graph showing the results of comparative experiments on carbonyl sulfide-adsorbing capacities of ordinary silica gel and one heat-treated under the invention.

In accordance with the invention experiments were conducted to obtain the following results.

EXPERIMENTAL EXAMPLE 1

Commercially available synthetic zeolites (or molecular sieves, hereinafter referred to as "MS") were taken as Samples I and the same zeolites heat-treated at 500° C. for 1 hour as Samples II. The latter looked blackish. About 80 g portions of Samples I and II were packed in cylindrical containers having an inside diameter of 23.9 mm and a length of 300 mm for uses as adsorption columns. Separately, a gaseous mixture of nitrogen with 10.3 ppm of nitrogen oxides was prepared in a high pressure vessel. The mixture was allowed to pass through the adsorption columns under identical conditions, and the nitrogen oxide content of the gas samples at the outlets of the columns was determined. Thus, the quantity of the gaseous mixture that had been flown through each column until the nitrogen oxide content of the test gas at the outlet reached 1 ppm was measured. The results are given in Table 1.

TABLE 1

| Kind of MS | Sample I | Sample II | Sample II/I |
|---|---|---|---|
| A (commercially available "MS4A", pore size 4 Å) | 25 l | 660 l | 26.4 |
| B (commercially available "MS5A", pore size 5 Å) | 6 l | 100 l | 16.7 |
| C (commercially available "MS13X", pore size 10 Å) | 6 l | 84 l | 14.0 |

Thus, it is now clear that heat-treating a synthetic zeolite in carbon monoxide markedly increases its capacity of adsorbing nitrogen oxides for removal.

Microscopic observation of the treated synthetic zeolite revealed that carbon particles ranging in size from about 0.01 to about 10 μm adhered to the zeolite surface. The particle size corresponded to that of transitional pores or macropores of the adsorbent. Generally speaking, the sizes of the pores opening on the surface of an adsorbent are at least 1000 Å, or 0.1 μm, in the vicinities of their inlets, between 20 and 1000 Å, or between 0.002 μm and 0.1 μm, midway, and between 4 to 20 Å, or between 0.0004 to 0.002 μm, deep inside. These pores, classified by size, are called macropores, transitional pores, and micropores, respectively. Apparently, the carbon particles that had resulted from the decomposition of the gas constituting the atmosphere by the reaction

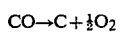

$$CO \rightarrow C + \tfrac{1}{2}O_2$$

were present and adhered in the vicinities of the inlets of the pores (macropores) and midway (transitional pores). The nitrogen oxide particles of 3 to 5 Å in size adsorbed thereby were presumably influenced somehow or other in the course of their adsorption and diffusion, and in this manner the adsorbent capacity for removing nitrogen oxides was improved. In other words, it may be presumed that the carbon particle adhering to the adsorbent exerts such an influence upon the diffusion of nitrogen oxide molecules outside the particles or into the pores inside the particles, or upon the adsorption or molecular sieve mechanism that it imparts new properties to the adsorbent.

EXPERIMENTAL EXAMPLE 2

Another experiment was conducted in a manner similar to the one described above but using synthetic zeolites treated under different heating conditions. Commercially available synthetic zeolites, marketed under trade designations "MS4A", "MS5A", and "MS13X", were grouped as Samples I. The same synthetic zeolites, heat-treated in an atmosphere of a gaseous mixture consisting of 20% carbon monoxide and 80% hydrogen at 350° C. for 2.5 hour, were grouped as Samples II. Each sample (75 g) was packed in a cylinder 20 mm across and 450 mm long to make an adsorption column. Separately prepared dry air containing 15 ppm carbon dioxide gas was passed through the column for removal of the carbon dioxide gas by adsorption. The quantities of air that had been treated until the carbon dioxide concentrations in the gas at the outlets of such adsorption columns reached a 1 ppm level were as given in Table 2.

TABLE 2

| Kind of MS | Sample I | Sample II | Sample II/I |
|---|---|---|---|
| A (commercially available "MS4A", pore size 4 Å) | 1.3 l | 1.7 l | 1.3 |
| B (commercially available "MS5A", pore size 5 Å) | 1.8 l | 2.5 l | 1.4 |
| C (commercially available "MS13X", pore size 10 Å) | 2.0 l | 2.8 l | 1.4 |

As can be seen from the table, the heat treatement in the mixture of carbon monoxide and hydrogen allowed the synthetic zeolites to have improved capacities of adsorbing and removing carbon dioxide gas from the test air.

EXPERIMENTAL EXAMPLE 3

A similar experiment was carried out with hydrogen sulfide and similar results were obtained. Comparative tests on the adsorption of hydrogen sulfide were made using commercially available activated carbon (specific surface area: 600–1500 m$^2$/g) and synthetic zeolites heat-treated in the same manner as in Experimental Example 2 (but at a higher temperature of 500° C. for one hour). Ordinary synthetic zeolites adsorb 4 to 5% by weight of hydrogen sulfide, whereas activated carbon attains a sulfur buildup of 20 to 60% by weight. (The term "sulfur buildup" is used because hydrogen sulfide decomposes into sulfur upon contact with activated carbon. Hydrogen sulfide and sulfur are approximately equal in weight.) This experiment revealed that the heat-treated synthetic zeolites have even greater hydrogen sulfide adsorption capacities than that of commercial activated carbon. A cylinder 70 mm long and 6 mm across was packed with about 1 g of commercial activated carbon, and a test gas prepared by adding 170 ppm of hydrogen sulfide to nitrogen gas was passed through this adsorption column at an apparent velocity, u, of 13 cm/sec (the residence time in the column being 0.6 sec). The quantity of the test gas flown before the detection of hydrogen sulfide at the outlet end of the adsorption column was about 10 l. Separately, a cylinder 160 mm long and 6 mm across was packed with 2.73 g of the heat-treated synthetic zeolite ("MS13X"), and the same test gas containing 170 ppm of hydrogen sulfide was passed through this adsorption column at an apparent velocity, u, of 13 cm/sec (for a residence time of 1.2 sec). The quantity of the test gas flown up to the detection of hydrogen sulfide at the outlet end of the column was about 110 l. These relations are graphically represented in FIG. 1. Further comparative tests were made using the above-mentioned adsorption columns but changing the test gas flow rates and uniformalizing the retention periods in the columns to 0.6 sec (apparent velocities, u, of 13 cm/sec for activated carbon and 27 cm/sec for the heat-treated synthetic zeolite). FIG. 2 shows the results. Here again the breakthrough point of hydrogen sulfide in the heat-treated synthetic zeolite ("MS13X") was found to be far behind that of activated carbon. This is another proof that the heat treatment of the synthetic zeolite in a carbon monoxide atmosphere adds substantially to its hydrogen sulfide adsorption capacity.

EXPERIMENTAL EXAMPLE 4

Still another experiment was performed similarly but using silica-alumina adsorbents (specific surface area: 150–700 m$^2$/g), and similar outcomes were obtained. Commercially available silica gel (specific surface area: 250–600 m$^2$/g) was heat-treated in an atmosphere of a gaseous mixture consisting of 20% carbon monoxide, 10% carbon dioxide gas, and 70% nitrogen at 180° C. for 4 hours. With ordinary silica gel and the one heat-treated in the foregoing way, tests were carried out for adsorption and removal of carbonyl sulfide (COS). Adsorption columns 25 mm across and 400 mm long were packed each with 98 g of the adsorbents. A separately prepared gas of nitrogen containing 80 ppm of carbonyl sulfide was passed through the adsorption columns under the conditions of apparent velocity, u, of 15 cm/sec and residence time in the column, t, of 2.7 sec. The carbonyl sulfide concentration in the gas at the outlet of each column was measured FIG. 3 represents the results. As is obvious from the graph, the breakthrough point of carbonyl sulfide in the heat-treated silica gel comes behind that in the untreated silica gel, thus suggesting better adsorptivity of the heat-treated silica gel.

As will be appreciated from the foregoing experimental results, a synthetic zeolite or silica gel attains an improved efficiency of removing specified gases by adsorption upon heat treatment in carbon monoxide or its mixture with another gas such as hydrogen, carbon dioxide gas, nitrogen, or other inorganic gases. The heating temperature in the range from 100° to 700° C. has been found to give similar favorable results, though varying to minor degrees.

Useful carbon-containing gases other than carbon monoxide which can yield similar satisfactory results are those that readily generate carbon by thermal decomposition, e.g., aromatic compounds such as benzene, toluene, and naphthalene; acyclic compounds (paraffinic, olefinic and acetylenic hydrocarbons) such as methane, ethane, propane, ethylene and alcohol; or their mixtures.

What is claimed is:

1. A gas adsorbent comprising either a zeolitic or silica-alumina adsorbent which has carbon particles ranging in size from about 0.01 to about 10 μm adhering on the surface and in pores thereof, said gas adsorbent being produced by heat-treating said adsorbent in a carbon-atom containing gas or a gaseous mixture consisting of a carbon-atom containing gas and an inorganic gas at a temperature of 100° C. to 700° C.

2. A process for producing a gas adsorbent which comprises heat-treating a zeolitic or silica-alumina adsorbent in a carbon-atom containing gas or a gaseous mixture consisting of a carbon-atom containing gas and an inorganic gas at 100° C. to 700° C., whereby carbon particles ranging in size from about 0.01 to about 10 μm adheres on the surface and in pores of the adsorbent.

3. A process according to claim 2 in which said carbon-atom containing gas is at least one selected from the group consisting of carbon monoxide, aromatic hydrocarbons, paraffinic hydrocarbon, olefinic hydrocarbons, acetylenic hydrocarbons, alcohols, and mixtures thereof.

* * * * *